US008377285B2

(12) United States Patent
Burris et al.

(10) Patent No.: US 8,377,285 B2
(45) **Date of Patent: *Feb. 19, 2013**

(54) METHODS AND SYSTEMS FOR MANUFACTURING MODIFIED ASPHALTS

(75) Inventors: Michael V. Burris, Carlsbad, CA (US); Bryan B. Burris, Carlsbad, CA (US); Hossein Ajideh, Carlsbad, CA (US); Andrew Clayton, Carlsbad, CA (US)

(73) Assignee: Asphalt Technology LLC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,595

(22) Filed: Mar. 14, 2011

(65) Prior Publication Data

US 2012/0063257 A1 Mar. 15, 2012

Related U.S. Application Data

(63) Continuation of application No. 12/484,013, filed on Jun. 12, 2009, now Pat. No. 7,906,011.

(60) Provisional application No. 61/061,316, filed on Jun. 13, 2008.

(51) Int. Cl.

| | |
|---|---|
| ***C10C 3/04*** | (2006.01) |
| ***C08L 95/00*** | (2006.01) |
| ***B01F 13/04*** | (2006.01) |
| ***B28C 5/38*** | (2006.01) |

(52) U.S. Cl. .................. 208/22; 208/44; 366/3; 366/13; 366/136; 106/273.1

(58) Field of Classification Search .................. 366/4, 2, 366/3, 6, 10, 11, 13; 208/22, 44

See application file for complete search history.

(56) References Cited

U.S. PATENT DOCUMENTS

| | | | | |
|---|---|---|---|---|
| 1,782,186 | A | | 11/1930 | Abson |
| 2,095,190 | A | | 10/1937 | Heuscher |
| 2,179,208 | A | | 11/1939 | Burk et al. |
| 2,200,914 | A | | 5/1940 | Burk et al. |
| 2,370,007 | A | | 2/1945 | Carr |
| 2,375,117 | A | | 5/1945 | Lentz |
| 2,450,756 | A | | 10/1948 | Hoiberg |
| 2,906,687 | A | * | 9/1959 | Roediger et al. .................. 208/5 |
| 3,105,896 | A | | 10/1963 | Tolin et al. |
| 3,126,329 | A | | 3/1964 | Fort |
| 3,462,359 | A | | 8/1969 | Hammond |
| 3,511,769 | A | | 5/1970 | Corbett et al. |
| 3,607,715 | A | | 9/1971 | Crawley |

(Continued)

FOREIGN PATENT DOCUMENTS

| | | |
|---|---|---|
| EP | 0 135 697 | 4/1985 |
| EP | 0 078 701 B1 | 1/1986 |

(Continued)

OTHER PUBLICATIONS

Brochure dated Jun. 1997 to a Siefer Trigonal™ in line mixer, pp. 4-16.*

(Continued)

*Primary Examiner* — Tony G Soohoo

(74) *Attorney, Agent, or Firm* — Knobbe Martens Olson & Bear LLP

(57) ABSTRACT

Methods and systems for efficiently manufacturing modified asphalt materials include agitating a base asphalt at a high shear rate using an in-line mixer while simultaneously exposing the asphalt to oxygen by blowing an oxygen-containing gas at a high gas flow rate through openings in the in-line mixer and heating the asphalt at an elevated temperature.

17 Claims, 5 Drawing Sheets

U.S. PATENT DOCUMENTS

| | | | |
|---|---|---|---|
| 3,652,445 | A | 3/1972 | Senolt et al. |
| 3,744,763 | A | 7/1973 | Schnoring et al. |
| 3,833,528 | A | 9/1974 | Behling et al. |
| 3,923,633 | A | 12/1975 | Senolt et al. |
| 3,935,093 | A | 1/1976 | Senolt et al. |
| 3,952,137 | A | 4/1976 | Turler |
| 4,211,576 | A | 7/1980 | Yan |
| 4,338,137 | A | 7/1982 | Goodrich |
| 4,436,864 | A | 3/1984 | Grossi et al. |
| 4,440,579 | A | 4/1984 | Eidem |
| 4,456,523 | A | 6/1984 | Carlos et al. |
| 4,456,524 | A | 6/1984 | Wombles et al. |
| 4,618,373 | A | 10/1986 | Eidem |
| 4,750,984 | A | 6/1988 | Ott |
| 4,882,373 | A | 11/1989 | Moran |
| 4,975,176 | A | 12/1990 | Begliardi et al. |
| 5,284,509 | A | 2/1994 | Kamel et al. |
| 5,302,638 | A | 4/1994 | Ho et al. |
| 5,336,705 | A | 8/1994 | Gorbaty et al. |
| 5,342,866 | A | 8/1994 | Trumbore et al. |
| 5,364,894 | A | 11/1994 | Portfolio et al. |
| 5,393,819 | A | 2/1995 | Peters |
| 5,397,818 | A | 3/1995 | Flanigan |
| 5,421,876 | A | 6/1995 | Janoski |
| 5,500,135 | A | 3/1996 | Smith et al. |
| 5,549,744 | A | 8/1996 | Puzic et al. |
| 5,583,168 | A | 12/1996 | Fianigan |
| 5,590,961 | A | 1/1997 | Rasmussen |
| 5,650,454 | A | 7/1997 | Hoover et al. |
| 5,719,215 | A | 2/1998 | Liang et al. |
| 5,863,971 | A | 1/1999 | Baanders et al. |
| 5,968,575 | A | 10/1999 | Rasmussen |
| 5,981,632 | A | 11/1999 | Fields |
| 6,019,499 | A | 2/2000 | Selivanov |
| 6,036,843 | A | 3/2000 | Marzari et al. |
| 6,060,542 | A | 5/2000 | Gooswilligen et al. |
| 6,087,419 | A | 7/2000 | Fields |
| 6,162,410 | A | 12/2000 | Marzari et al. |
| 6,325,986 | B1 | 12/2001 | Marzari et al. |
| 6,407,043 | B1 | 6/2002 | Moehr |
| 7,060,743 | B2 | 6/2006 | Deygout et al. |
| 7,202,290 | B2 | 4/2007 | Stuart et al. |
| 7,374,659 | B1 | 5/2008 | Burris et al. |
| 7,446,139 | B2 | 11/2008 | Martin |
| 2008/0015287 | A1 | 1/2008 | Butler et al. |

FOREIGN PATENT DOCUMENTS

| | | |
|---|---|---|
| EP | 0 459 811 B1 | 10/1994 |
| EP | 0 618 274 A1 | 10/1994 |
| WO | WO 93/17076 | 9/1993 |
| WO | WO94/06887 | 3/1994 |

OTHER PUBLICATIONS

ASTM D8-97. "Standard Terminology Relating to Materials for Roads and Pavements," *Annual Book of ASTM Standards*, vol. 04.03, American Society for Testing and Materials, West Conshohocken, PA, 1999.

Billiter et al, "*Investigation of the Curing Variables of Asphalt-Rubber Binder*."Petroleum Science and Technology, vol. 15, No. 5&6, 1997, pp. 445-469.

Billiter et al., "*Production of Asphalt-Rubber Binders by High-Cure Conditions*." In *Transportation Research Record* 1586, TRB, National Research Council, Washington D.C., 1997, pp. 50-56.

Chipps, et al., "*Oxidative Aging of Asphalt Rubber and Implications to Performance Analysis" ACS Preprint*, vol. 43, No. 4, Boston, MA, Aug. 22-27, 1998, pp. 1057-1062.

Davison, et al., "*Producing Superior Asphalts Through Air Blowing*." To be presented at the 218th ACS National Meeting in New Orleans, LA, Aug. 22-26, 1999.

Glover et al., "*A Comprehensive Laboratory and Field Study of HighCure Crumb-Rubber Modified Asphalt Materials*," Report 1460-1, Jan. 2000.

Kamel, et al., "*Critical laboratory evaluation of asphalt binders modified by refining processes" 49th* Annual CTAA Conference, Montreal, Nov. 22, 2004.

Kowalski, "*An expression for the power consumption of in-line rotor-stator devices*," Chemical Engineering and Processing, vol. 48, Apr. 12, 2008, pp. 581-585.

International Search Report and the Written Opinion of the International Searching Authority mailed on Jul. 15, 2010 in the corresponding PCT/US2009/047252 application.

Supaton High Sear InLine Homgenizer, The article of an inline mixer: Supraton model S500.4.5.5 Serial No. 5249 as manufactured by Don-Oliver Deutschland GmbH, and as shown, 2 pages. 1993.

Surpraton—High shear in-line Homogeniser Brochure 2005, BWS Technologies GmbH, total 8 pages, circa 2005.

* cited by examiner

METHODS AND SYSTEMS FOR MANUFACTURING MODIFIED ASPHALTS

CROSS-REFERENCE TO RELATED APPLICATIONS

This application is a continuation of U.S. patent application Ser. No. 12/484,013, which was filed on Jun. 12, 2009 and is now U.S. Pat. No. 7,906,011, which is related to, and claims the benefit of, U.S. Provisional Application No. 61/061,316, filed Jun. 13, 2008, each of which is hereby incorporated by reference in their entirety for all purposes.

BACKGROUND OF THE INVENTION

1. Field of the Invention

This invention generally relates to systems and methods for efficiently manufacturing modified asphalt materials.

2. Description of the Related Art

Conventional air-blowing of asphalt materials involves passing an oxidizing gas through the asphalt in a molten condition. In general, the effect of such conventional air-blowing is to partially oxidize the asphalt, resulting in decreased penetration and increased viscosity and softening point. However, for paving applications, such conventional air-blowing generally has a negative effect on the fatigue resistance and the low temperature properties.

U.S. Pat. No. 7,374,659, issued May 20, 2008, describes methods for making modified asphalts that involve blowing an oxygen-containing gas through a base asphalt while simultaneously subjecting the base asphalt to elevated temperatures and high levels of shear. Surprisingly, it was found that the resulting modified asphalts had both substantially improved rutting resistance and substantially improved fatigue resistance as compared to the base asphalts. Although U.S. Pat. No. 7,374,659 describes significant advances in the art, there remains a need for improved methods and systems of efficiently manufacturing modified asphalt materials on an industrial scale.

SUMMARY OF THE INVENTION

Preferred embodiments provide improvements to the asphalt modification methods and systems described in U.S. Pat. No. 7,374,659. In particular, preferred embodiments provide systems and methods for efficiently manufacturing modified asphalt using an in-line mixer equipped with a rotor-stator mixing tool. The rotor-stator mixing tool applies high levels of shear to the base asphalt, and contains openings that are configured to allow an oxygen-containing gas to be blown through the base asphalt while flowing the base asphalt through the in-line mixer at an elevated temperature to form modified asphalt. In the past, the use of in-line mixers for agitating asphalt on a large scale had been considered relatively inefficient because it was believed that relatively large (and expensive) in-line mixers drawing undesirably large amounts of power would be needed because of the relatively high viscosity of the asphalt, even at elevated temperatures. Surprisingly, it has been found that the flow rate of the oxygen-containing gas through the in-line mixer (and thus through the openings in the rotor-stator mixing tool) significantly affects the power drawn by the in-line mixer during the agitating of the base asphalt. It has also been found that the flow rate of the base asphalt through the in-line mixer affects the power drawn by the in-liner mixer, and that efficiency can be improved by controlling the temperature of the modified asphalt during production by selection of the pumping rate for the base asphalt through the in-line mixer.

In various embodiments, these findings are used to advantage by selecting a pumping rate for the base asphalt through the in-line mixer in such a way as to control the power drawn by the in-line mixer and/or to control the temperature of the modified asphalt, and/or selecting the gas flow rate to control the amount of power drawn by the in-line mixer during the agitating of the base asphalt. Preferably, one or more of the aforementioned are selected so that the power drawn is in the range of about 60% to about 95% of the maximum power rating of the in-line mixer. Such selections of pumping rate and gas flow rate for the oxygen-containing gas are less than would otherwise be considered optimal because in many cases the asphalt is insufficiently oxidized by a single pass through the in-line mixer, and often the desired level of modification is achieved after recycling the asphalt through the in-line mixer. However, in terms of overall manufacturing efficiency, it has been found that the negative impact on throughput resulting from such recycling is more than offset by energy cost savings obtained by operating the in-line mixer in such a way that it draws an amount of power that is in the range of about 60% to about 95% of the maximum power rating of the in-line mixer. In preferred embodiments, the pumping rate of the asphalt through the in-line mixer and the gas flow rate are selected in combination to control both the temperature of the modified asphalt and the power drawn by the in-line mixer.

An embodiment provides a method for manufacturing a modified asphalt, comprising flowing a base asphalt at a base asphalt flow rate through an in-line mixer having a maximum power rating, the in-line mixer being equipped with a rotor-stator mixing tool having openings therein configured to allow an oxygen-containing gas to be blown through the base asphalt while flowing the base asphalt through the in-line mixer, and agitating the base asphalt at a high shear rate using the rotor-stator mixing tool while simultaneously (a) blowing the oxygen-containing gas at a high gas flow rate through the openings in the rotor-stator mixing tool and (b) heating the base asphalt at an elevated temperature for a treatment time to thereby produce a modified asphalt.

In an embodiment, the base asphalt flow rate, the high gas flow rate, the high shear rate, the elevated temperature and the treatment time are all selected to substantially improve both the rutting resistance and the fatigue resistance of the modified asphalt as compared to the base asphalt. In an embodiment, the base asphalt flow rate is further selected to control the amount of power drawn by the in-line mixer during the agitating of the base asphalt, the amount of power being in the range of about 60% to about 95% of the maximum power rating. In an embodiment, the base asphalt flow rate is further selected to provide a temperature of the modified asphalt in the range of about 380° F. to about 470° F. In an embodiment, the high gas flow rate is further selected to control the amount of power drawn by the in-line mixer during the agitating of the base asphalt, the amount of power being in the range of about 60% to about 95% of the maximum power rating. In an embodiment, the agitating of the base asphalt at the high shear rate using the rotor-stator mixing tool comprises recirculating at least a portion of the base asphalt through the in-line mixer.

Another embodiment provides a system for modifying asphalt comprising a container configured to hold a base asphalt at an elevated container temperature, and a set of heated flow lines configured to carry the base asphalt to an in-line mixer and back to the container while maintaining the base asphalt at elevated process temperatures. In an embodiment, the in-line mixer has a maximum power rating and is equipped with a rotor-stator mixing tool having openings therein configured to allow an oxygen-containing gas to be blown through the base asphalt while flowing the base asphalt through the in-line mixer, the in-line mixer being configured to agitate the base asphalt at a high shear rate.

In an embodiment, the system comprises a gas source configured to introduce the oxygen-containing gas into the in-line mixer at a high gas flow rate. In an embodiment, the system comprises a controller configured to control the base asphalt flow rate, the gas flow rate and the high shear rate. In an embodiment, the controller is further configured to control the amount of power drawn by the in-line mixer by controlling at least one of the base asphalt flow rate and the gas flow rate during the agitating of the base asphalt. In an embodiment, the amount of power drawn by the in-line mixer being in the range of about 60% to about 95% of the maximum power rating.

These and other embodiments are described in greater detail below.

DETAILED DESCRIPTION OF THE PREFERRED EMBODIMENTS

Figure 1:
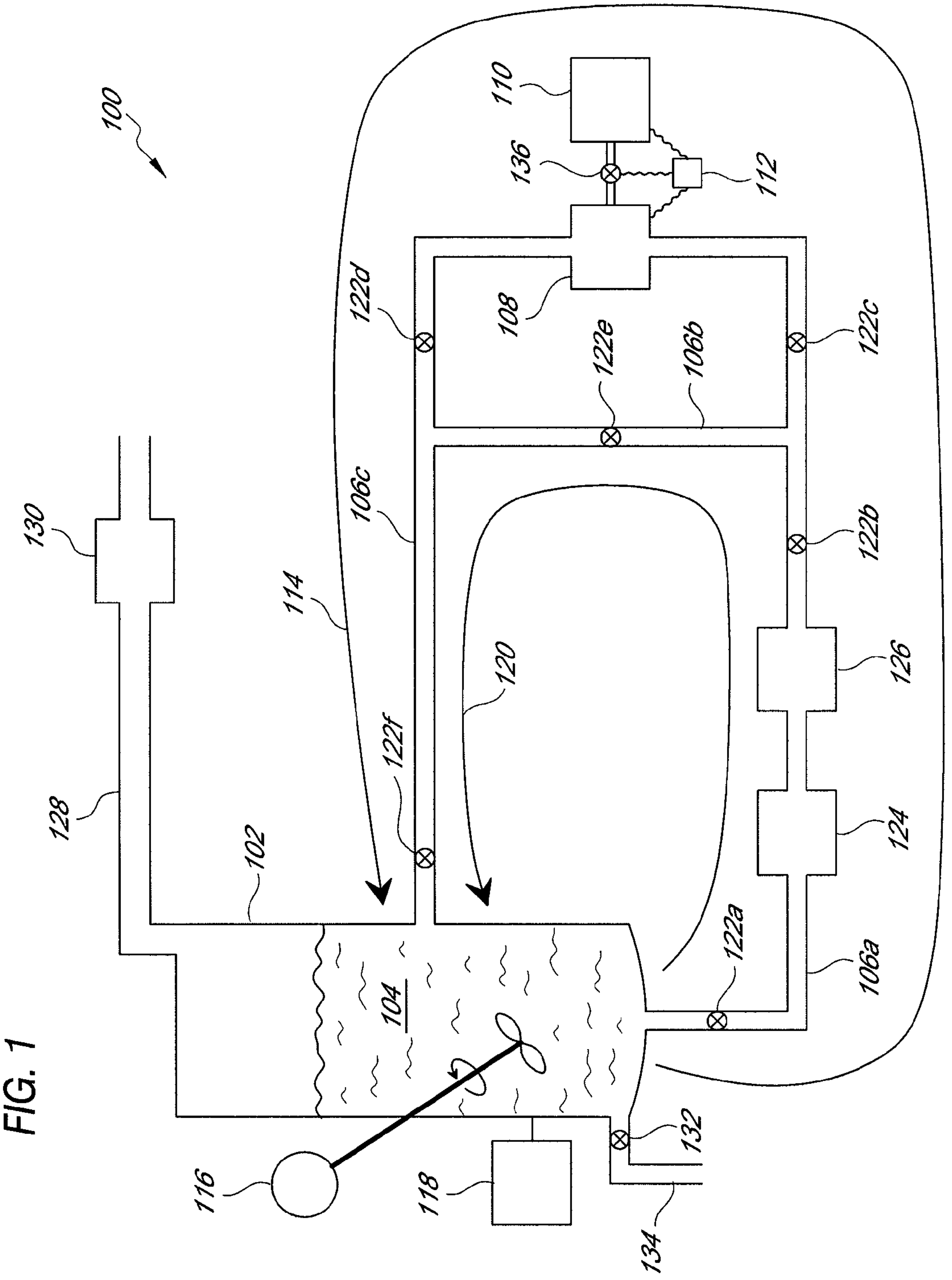
FIG. 1 is a schematic diagram illustrating various features of an embodiment of an asphalt modification system 100.

The term "asphalt" is used herein in its ordinary sense and thus includes a variety of dark-colored relatively viscous hydrocarbon-containing materials that are produced from petroleum feedstocks and/or residues. Examples of such asphalts are those typically used in roofing and paving applications. A base asphalt is an asphalt from which a modified asphalt is produced by, e.g., the preferred asphalt modification methods described herein. A first modified asphalt may be further modified to make a second modified asphalt, and thus the term "base asphalt" includes previously modified asphalts and asphalts modified in previous stages or cycles of the modification process. Non-limiting examples of base asphalts include the AR-8000 and PG 64-16 asphalts commercially available from San Joaquin Refining and Valero Benicia (Calif.). An asphalt may be referred to as an asphalt binder or simply as a binder, e.g., in the context of asphalts suitable for paving applications.

An embodiment provides a method of making a modified asphalt, comprising blowing an oxygen-containing gas (e.g., air) through a base asphalt at a high gas flow rate while simultaneously agitating the base asphalt in an in-line mixer at a high shear rate and at an elevated temperature for a treatment time to thereby produce a modified asphalt, wherein the high gas flow rate, the high shear rate, the elevated temperature and the treatment time are all selected to substantially improve at least two paving properties of the modified asphalt as compared to the base asphalt. In an embodiment, at least three paving properties are substantially improved as compared to the base asphalt. Non-limiting examples of paving properties that may be substantially improved by the practice of this embodiment include rutting resistance, fatigue resistance, tensile strength, and PG grade. Various paving properties are described in the AASHTO Standards (referred to in U.S. Pat. No. 7,374,659), and/or the Testing Methods According to NCHRP 9-10 (National Cooperative Highway Research Program) Report 459 (referred to in U.S. Pat. No. 7,374,659), both of which also describe various test methods for determining whether a paving property is substantially improved. Substantial improvements in rutting resistance (as evidenced by, e.g., substantially decreased accumulated strain), fatigue resistance (as evidence by, e.g., increased number of cycles before failure), and PG grade may be measured as described in U.S. Pat. No. 7,374,659.

Those skilled in the art are able to determine when an improvement in rutting resistance and/or fatigue resistance is substantial. For example, an improvement in a paving property of about 5% or more is typically considered substantial. In a preferred embodiment, substantial improvements of about 10% or more in a paving property may be obtained, more preferably 25% or more, more preferably 50% or more, even more preferably 100% or more. With respect to improvements in PG grade, an increase of at least one grade is considered a substantial improvement in a paving property. The fatigue resistance and rutting resistance can be measured under various conditions selected in accordance with standard methods, e.g., at selected temperature levels and levels of applied pressure. In an embodiment, the rutting resistance is tested at 100 Pa. In an embodiment, the rutting resistance is tested at 3200 Pa. In an embodiment, the rutting resistance is tested at both 100 Pa and 3200 Pa, and is improved at either or both. In an embodiment, the rutting resistance is tested at 64° C. In an embodiment, the rutting resistance is tested at 70° C. In an embodiment, the rutting resistance is tested at both 64° C. and 70° C., and is improved at either or both. In an embodiment, the fatigue resistance is tested at one stress level. In an embodiment, the fatigue resistance is tested at two different stress levels. In an embodiment, the fatigue resistance is improved at one stress level. In an embodiment, the fatigue resistance is improved at two different stress levels. In an embodiment, an improvement of at least one PG grade is a substantial improvement in rutting resistance. In an embodiment, an improvement in Np20 of at least about 5% is a substantial improvement in fatigue resistance at the same applied stress level.

Various tests are available for measuring paving properties such as rutting resistance and fatigue resistance, and those skilled in the art may select the appropriate test in light of the circumstances of a particular situation in order to determine whether the paving property of the modified asphalt is substantially improved as compared to the base asphalt. In most cases the results of the various tests are sufficiently similar that the selection of the testing method may be made of the basis of practical criteria such as cost, timing and equipment availability. The testing methods set forth in the AASHTO Standards referred to above and in the Testing Methods According to NCHRP 9-10 (National Cooperative Highway Research Program) Report 459 referred to above are considered "standard" test methods for determining whether the paving property of the modified asphalt is substantially improved as compared to the base asphalt. In a given situation, if a particular non-standard paving property test result is in conflict with a particular standard paving property test result, then the standard paving property test result is used for determining the paving property. Notwithstanding the foregoing, paving property test results obtained by the methods described herein and/or in U.S. Pat. No. 7,374,659 take precedence over both standard and non-standard paving property test results for the determination of whether the paving property of a modified asphalt is substantially improved as compared to the base asphalt.

It will be understood that an improvement in a paving property may be evidenced by a decrease in a particular test value used in the determination of that paving property. For example, accumulated strain is a parameter that is directly related to permanent deformation, and thus may be used as an indicator of the rutting resistance of the asphalt. Those skilled in the art understand that a lower accumulated strain value is an indicator of higher rutting resistance, and thus a substantial improvement in a paving property such as rutting resistance may be evidenced by an accumulated strain value for the modified asphalt that is, e.g., less than about 50% of the accumulated strain value for the base asphalt, preferably less than about 70% of the accumulated strain value for the base asphalt. Accumulated strain values may be measured by Creep and Recovery tests conducted for 100 cycles at 64° C. as described in U.S. Pat. No. 7,374,659. Creep and Recovery tests may also be conducted at other high temperatures (e.g., 70° C., 76° C., 82° C.) determined according to MP1, depending on the Maximum Pavement Design Temperature and the PG grade of the asphalt in a manner known to those skilled in the art.

In other cases, an improvement in a paving property may be evidenced by an increase in a particular test value used in the determination of that paving property. For example, a substantially improved fatigue life may be evidenced by a fatigue life value for the modified asphalt that is at least about twice a fatigue life value for the base asphalt, preferably at least about three times a fatigue life value for the base asphalt. Fatigue life values for the modified asphalt and for the base asphalt may be determined by Repeated Cyclic Loading tests conducted at 34° C. and 10 Hz, as described in U.S. Pat. No. 7,374,659. Repeated Cyclic Loading tests are preferably conducted at an intermediate temperature (IT) appropriate for the asphalt in light of the anticipated climate conditions (e.g., 34° C., 37° C., 40° C.) and at a frequency (e.g., 1.6 Hz, 10 Hz) selected in light of anticipated traffic conditions, in a manner known to those skilled in the art. The determination of IT is preferably based on whether freeze-thaw cycles occur in the region or not. If the freeze-thaw phenomenon is predominant, the IT is preferably 12° C. If the freeze-thaw phenomenon is rare, the IT should be the average of HT and LT determined according to MP1.

In some embodiments, the paving properties that are substantially improved are improved by a synergistic combination of any two or more process parameters, preferably three or more process parameters, selected from group consisting of the base asphalt flow rate, the high gas flow rate, the high shear rate, the elevated temperature, and the treatment time. For example, as illustrated in U.S. Pat. No. 7,374,659, increases in treatment temperature, e.g., from 250° F. to 400° F., at a shear rate of 2,000 rpm in the absence of air-blowing, tend to result in little or no change in accumulated strain. However, in the presence of air-blowing, substantial improvements in accumulated strain are obtained, particularly at higher temperatures and shear rates. In preferred embodiments, at least one paving property selected from the group consisting of rutting resistance, fatigue resistance and PG grade is substantially improved by a synergistic combination of any two or more process parameters, preferably three or more process parameters, selected from group consisting of the base asphalt flow rate, the high gas flow rate, the high shear rate, the elevated temperature, and the treatment time.

A preferred embodiment provides a method for efficiently manufacturing a modified asphalt, comprising blowing an oxygen-containing gas (e.g., air) through a base asphalt at a high gas flow rate while simultaneously agitating the base asphalt in an in-line mixer at a high shear rate and at an elevated temperature for a treatment time to thereby produce a modified asphalt, wherein the flow rate of the base asphalt through the in-line mixer, the high gas flow rate, the high shear rate, the elevated temperature and the treatment time are all selected to substantially improve both the rutting resistance and the fatigue resistance of the modified asphalt as compared to the base asphalt. As noted in U.S. Pat. No. 7,374,659, achievement of substantial improvements in both rutting resistance and the fatigue resistance is surprising because the conventional wisdom is generally that while air-blowing may in some cases increase rutting resistance, it also increases the stiffness and brittleness of the base asphalt, resulting in a negative effect on fatigue resistance and/or low temperatures properties.

FIG. 1 illustrates an example of a system 100, as well as an example of a method of manufacturing modified asphalt using such a system. As explained in greater detail below, the system 100 comprises a container 102 configured to hold a base asphalt 104 at an elevated container temperature. The system 100 also comprises a pump 126 and a set of heated flow lines 106*a*, 106*c* configured to carry the base asphalt 104 from the container 102 to an in-line mixer 108 and back to the container 102 at a selected base asphalt flow rate while maintaining the base asphalt at elevated process temperatures. The in-line mixer 108 is equipped with a rotor-stator mixing tool (situated within the in-line mixer, not illustrated in FIG. 1) that is configured to agitate the base asphalt at a high shear rate within the in-line mixer 108. The rotor-stator mixing tool contains openings configured to allow an oxygen-containing gas to be blown through the base asphalt while flowing the base asphalt through the in-line mixer 108. The system 100 further comprises a gas source 110 configured to introduce the oxygen-containing gas into the in-line mixer 108 at a high gas flow rate. The system 100 also comprises a controller 112 configured to control the gas flow rate and the high shear rate (and, optionally, other system parameters such as the base asphalt flow rate, container temperature and process temperatures). The controller 112 is further configured to control the amount of power drawn by the in-line mixer 108 by controlling the gas flow rate (via a valve 136) during the agitating of the base asphalt by the in-line mixer, such that the amount of power drawn by the in-line mixer 108 is in the range of about 60% to about 95% of the maximum power rating of the in-line mixer 108. Thus, with reference to FIG. 1, an embodiment of a method of manufacturing modified asphalt comprises flowing the base asphalt 104 at a base asphalt flow rate through the in-line mixer 108. The method further comprises agitating the base asphalt in the in-line mixer 108 at a high shear rate using the rotor-stator mixing tool while simultaneously (a) blowing the oxygen-containing gas at a high gas flow rate through the openings in the rotor-stator mixing tool and (b) heating the base asphalt within the in-line mixer at an elevated temperature for a treatment time to thereby produce a modified asphalt. The base asphalt flow rate, the high gas flow rate, the high shear rate, the elevated temperature and/or the treatment time are selected to substantially improve both the rutting resistance and the fatigue resistance of the modified asphalt as compared to the base asphalt. The base asphalt flow rate and/or the high gas flow rate are also selected to control the amount of power drawn by the in-line mixer 108 during the agitating of the base asphalt, such that the amount of power drawn by the in-line mixer 108 is in the range of about 60% to about 95% of the maximum power rating of the in-line mixer. In the illustrated embodiment, the base asphalt 104 flows from the container 102 through the heated flow line 106*a* to the in-line mixer 108 and then returns to the container 102 through the heated flow line 106*c*, thus completing a production cycle or loop 114.

FIG. 1 illustrates additional details of the system 100 and a method of manufacturing modified asphalt using it. It will be appreciated by those skilled in the art that the illustrated system 100 and method are examples, and that the system and method may be practiced separately or together, with or without various steps and/or features described herein with respect to the illustrated embodiments, and with or without modification and/or rearrangement of such steps and/or features. For example, in the illustrated embodiment, the container 102 is sized to hold about 3,000 gallons of the base asphalt 104, but those skilled in the art can readily use routine experimentation informed by the guidance provided herein to adapt the system 100 for the modification of lesser or greater quantities of asphalt. Likewise, in the illustrated embodiment, the in-line mixer 108 is a Supraton model S400 high shear in-line homogenizer equipped with a nozzle tool set, which includes a rotor-stator mixing tool having openings configured to introduce a gas into the material being mixed and having a maximum power rating of 100 horsepower (hp), available commercially from WS Technologies GmbH, Germany, but those skilled in the art can readily use routine experimentation informed by the guidance provided herein to select or adapt other in-line mixers for use in particular situations. In the illustrated embodiment, the system 100 includes a single in-line mixer 108, but it will be appreciated that the system 100 may comprise two or more in-line mixers, and that they may be arranged in parallel or in series, preferably in parallel. Similarly, the oxygen-containing gas supplied by the gas source 110 in the illustrated embodiment is air, but other oxygen-containing gases, including recirculated air, may be used. The gas source 110 in the illustrated embodiment includes a compressor (not depicted in FIG. 1) which supplies air at a regulated pressure of about 110 psi, an air temperature at the compressor outlet of about 140° F., and provides air at a gas flow rate in the range of about 5 standard cubic feet per minute (SCFM) to about 50 SCFM, and preferably at a gas flow rate of about 40 SCFM. Those skilled in the art can readily use routine experimentation informed by the guidance provided herein to select or adapt these conditions for use in particular situations. The air may be supplied at gas flow rates lower than 5 SCFM, but in many cases the resulting increase in saved energy is offset by lower throughput resulting from the lower gas flow rates.

As illustrated, the container 102 is equipped with a stirring apparatus 116 and a heater 118. The stirring apparatus 116 is sized and powered to circulate the base asphalt 104 within the container 102 in order to reduce stratification and facilitate efficient recirculation of the asphalt 104 through the loop 114. The heater 118 is sized and powered to control the temperature of the base asphalt 104 within the container 102 to be in the desired range of about 100° F. to about 500° F., preferably at a temperature in the range of about 250° F. to about 450° F. The heater 118 may also be used to control the process temperature of the base asphalt 104 in the heated flow lines 106*a*, 106*c* during the flowing of the base asphalt 104 from the container 102 to the in-line mixer 108 and back to the container 102 (and/or through heated flow line 106*b* in bypass loop 120, discussed in greater detail below), or a separate heater (not illustrated in FIG. 1) may be used. The heated flow lines 106*a,b,c* have a diameter of about three inches in the illustrated embodiment, although other sizes may be used. The system 100 also includes a various valves 122*a,b,c,d,e,f*, along with a mass flow meter 124 and a pump 126, configured to monitor and control the flow of the asphalt through the heated flow lines 106*a,b,c*. The mass flow meter 124 may include a controller configured to control the pump 126 and thereby control the amount of power drawn by the in-line mixer 108 by controlling the base asphalt flow rate during the agitating of the base asphalt by the in-line mixer, such that the amount of power drawn by the in-line mixer 108 is in the range of about 60% to about 95% of the maximum power rating of the in-line mixer 108, preferably in the range of about 70% to about 90% of the maximum power rating. In addition to or instead of control exercised by a controller associated with the mass flow meter 124, control of the base asphalt flow rate may be exercised by the controller 112 or by some other controller (not depicted in FIG. 1). Thus, reference herein to a controller will be understood by those skilled in the art to include use of a single controller or multiple controllers.

It is preferred that the pump 126 be relatively oversized as the entrainment of the air within the asphalt tends to decrease both the effective density of the asphalt and the efficiency of the pump 126. In the illustrated embodiment, the pump 126 is a five-inch Viking Model N34 pump having a variable frequency (variable speed) drive and a power rating of about 20 hp (available commercially from Viking Pump, Inc., Cedar Falls, Iowa), but pumps of other sizes may also be used. In the illustrated embodiment, the asphalt is pumped by the pump 126 at a flow rate in the range of about 60 gallons per minute (GPM) to about 200 GPM, and preferably at a flow rate in the range of about 180 GPM to about 190 GPM. In an embodiment, the flow rate of the asphalt (as controlled by the pump and any controller associated with the pump) is selected such that the amount of power drawn by the in-line mixer 108 is in the range of about 60% to about 95% of the maximum power rating of the in-line mixer 108, preferably in the range of about 70% to about 90% of the maximum power rating. As discussed in greater detail below, the temperature of the asphalt exiting the in-line mixer 108 is typically higher than the temperature of the asphalt on the inlet side of the in-line mixer 108, due to heat transferred to the asphalt during the agitation. In preferred embodiments, both the base asphalt flow rate and the gas flow rate are selected in combination to control both the temperature of the modified asphalt and the power drawn by the in-line mixer. In preferred embodiments, power drawn by the in-line mixer 108 is in the range of about 75% to about 85% of the maximum power rating of the in-line mixer. In preferred embodiments, power drawn by the in-line mixer 108 is in the range of about 80% to about 85% of the maximum power rating of the in-line mixer.

Fumes from the hot asphalt 104 in the container 102 are exhausted via a duct 128 equipped with a scrubber 130. These fumes may contain oxygen and thus may be suitable for recirculation in a closed loop, optionally through an intercooler/heat exchanger, back into the system 100. For example, in an embodiment (not illustrated), instead of being exhausted through the scrubber 130, part or all of the fumes from the hot asphalt 104 are returned to the loop 114 (e.g., back to the gas source 110 and, optionally, intermixed with fresh air) to be blown through the base asphalt. An oxygen monitoring and/or control system (not illustrated in FIG. 1), operably connected to the duct 128 and/or the controller 112, may be used to determine and control the appropriate amount of fresh air and/or recirculated air blown through the asphalt in the in-line mixer 108.

The container 102 is also equipped with a valve 132 and an outlet 134 configured to facilitate removal of the resulting modified asphalt from the container 102. The system 100 may also include a controller (e.g., a computer) (not illustrated in FIG. 1) operably connected to, and configured to control and/or monitor, the various parts of the system discussed herein, e.g., the in-line mixer 108, the stirring apparatus 116, the gas source 110, the heater 118, the valves 122*a,b,c,d,e,f* and 132, the mass flow meter 124, the pump 126, and/or the oxygen monitoring/control system (discussed above, not illustrated in FIG. 1). Such a computer may be part of, or separate from, the controller 112.

With reference to FIG. 1, an embodiment of a method of modifying a base asphalt using the system 100 is provided as follows: With all valves in the closed position, the base asphalt 104 in the container 102 is heated by the heater 118 to a temperature of about 400° F. while stirring with the stirring apparatus 116. The valves 122*a,b,e,f* are opened and the pump 126 is used to pump the heated base asphalt 104 through the heated flow lines 106*a,b,c* and back to the container 102. Since the valves 122*c,d* are closed at this stage, the heated base asphalt 104 does not flow through the in-liner mixer 108 and thus flows in the bypass loop 120 rather than in the production loop 114. The process temperature of the base asphalt in the heated flow lines 106*a,b,c* is also about 400° F. in this embodiment, but need not be the same as the temperature of the base asphalt 104 in the container 102. The process temperature of the base asphalt 104 in the container 102 and in the heated flow lines 106*a,b,c* may be lower, e.g., about 350° F., but desirable improvements in properties are obtained at higher process temperatures in the range of about 400° F. to about 450° F., and heating of the base asphalt using the heater 118 tends to be more efficient than relying on the heating caused by the oxidation of the asphalt by the air within the in-line mixer 108 as described below.

The high shear agitation of the base asphalt 104 is then initiated by opening the valves 122*d* and 136, partly opening valve 122*c* and allowing asphalt to flow through the in-line mixer 108. A portion of the base asphalt in the bypass loop 120 is diverted to the in-line mixer 108 via the partly opened valve 122*c*. As the lines warm operation of the system 100 continues by gradually opening the valve 122*c* and closing the valve 122*e*. The in-line mixer 108 is powered up and air is provided from the gas source 110 via the open valve 136 to the rotor-stator mixing tool (within the in-line mixer 108), where it flows through the openings in the mixing tool and intermixes with the hot base asphalt being agitated at high shear within the in-liner mixer 108 at the process temperature of about 400° F. The shear rate can vary. In an embodiment, the shear rate is at least about 2000 rpm. In an embodiment, the shear rate is in the range of about 2000 rpm to about 10000 rpm. In an embodiment, the shear rate is at least about 3000 rpm. In an embodiment, the shear rate is in the range of about 3000 rpm to about 5000 rpm. The amount of air mixing with the asphalt in the in-line mixer 108 is controlled by the controller 112 to be an amount which reduces the apparent viscosity of the asphalt, thus allowing the in-liner mixer 108 to be run below its maximum power rating. Operation of the system 100 continues as the asphalt flows through the heated flow lines 106*a,c* in production loop 114. Operation of the system 100 continues by adjusting the gas flow rate of the air into the in-line mixer 108 to control the amount of power drawn by the in-line mixer 108 during the agitating of the base asphalt. In the illustrated embodiment, the gas flow rate is controlled by the controller 112 so that the amount of power drawn by the in-line mixer 108 is in the range of about 60% to about 95% of the maximum power rating of the in-line mixer. Preferably, the gas flow rate is controlled by the controller 112 so that the amount of power drawn by the in-line mixer is in the range of about 70% to about 90% of the maximum power rating, e.g., about 80%.

During continued operation of the system 100, the asphalt flows through the container 102 (as facilitated by stirring using the stirring apparatus 116) and through the heated flow lines 106*a,c* in the production loop 114 at a process temperature in the range of about 250° F. to about 500° F., preferably in the range of about 380° F. to about 470° F., more preferably in the range of about 400° F. to about 450° F., while simultaneously blowing air through the asphalt via the openings in the rotor-stator mixing tool (within the in-line mixer 108) and agitating the asphalt at a high shear rate. During treatment, the agitating and oxidation of the asphalt by the air within the in-line mixer 108 tends to increase the temperature of the asphalt, reducing or eliminating the need to use the heater 118 to heat the container 102 and/or the flow lines 106*a,c*. The increase in asphalt temperature between the inlet side of the in-line mixer 108 and the outlet side is preferably controlled so that the asphalt temperature on the outlet side does not exceed about 550° F., preferably does not exceed about 500° F. Higher pumping rates, higher shear rates and higher gas flow rates all tend to increase the asphalt temperature on the outlet side. In an embodiment, the asphalt temperature on the outlet side is controlled by selecting the base asphalt flow rate (e.g., via the pumping rate of the pump 126), the shear rate of the in-line mixer 108, and/or the gas flow rate.

The treatment is continued for the desired treatment time, e.g., until the desired increase in both the rutting resistance and the fatigue resistance of the modified asphalt is achieved, as compared to the base asphalt. Although some increase is obtained by passing the asphalt through a single production cycle 114 using the system 100, in the illustrated embodiment the treatment is continued and the asphalt is recirculated until sufficient asphalt has been pumped through the mass flow meter 124 to indicate that about 20 to 40 production cycles 114 have been completed, resulting in an increase in PG grade of from about PG 64 (base asphalt) to about PG 76. The resulting modified asphalt is then discharged from the container 102 via the outlet 134 by opening the valve 132.

The number of production cycles may be varied, depending on the degree of modification desired. The number of production cycles can be estimated by multiplying the asphalt flow rate by the duration of asphalt modification, and dividing that number by the total amount of asphalt in the system. For example, an asphalt flow rate of 200 gallons per minute flowing through the system for an hour corresponds to about 12,000 gallons of asphalt that has undergone modification in the system. If the total amount of asphalt in the system is 3000 gallons under those conditions (200 gal/min for one hour), then the number of production cycles of asphalt modification can be estimated to be about 4. In an embodiment, the asphalt is recirculated until the number of production cycles is in the range of about 2 to about 100. In an embodiment, the asphalt undergoes at least about 2 production cycles. In an embodiment, the asphalt undergoes at least about 3 production cycles. In an embodiment, the asphalt undergoes at least about 4 production cycles. In an embodiment, the asphalt undergoes at least about 10 production cycles. In an embodiment, the asphalt undergoes at least about 20 production cycles. In an embodiment, the asphalt undergoes at least about 30 production cycles. In an embodiment, the asphalt undergoes at least about 40 production cycles. In an embodiment, the asphalt undergoes at least about 50 production cycles.

After the initial production cycles, one or more of the production parameters may be altered or may remain the same during recirculating of the asphalt in one or more subsequent production cycles. In an embodiment, at least one of the base asphalt flow rate, the high gas flow rate, the high shear rate, the elevated temperature and the treatment time, is maintained at substantially the same level during the recirculating, as compared to the initial or any other prior production cycle. In another embodiment, at least one of the base asphalt flow rate, the high gas flow rate, the high shear rate, the elevated temperature and the treatment time, is altered to be at a substantially different level during the recirculating, as compared to the initial or any other prior production cycle.

Routine experimentation informed by the guidance provided herein may be used to determine the number of production cycles needed to provide a particular increase in a desired property. It has been found that the viscosity of any particular asphalt is related to its PG grade. Thus, one skilled in the art informed by the guidance provided herein may readily construct a calibration curve for any particular type of asphalt by measuring both the viscosity and the PG grade, and determining the appropriate correlation. Viscosity is typically faster and simpler to measure than PG grade, and thus one skilled in the art may use viscosity measurements made during production to estimate PG grade and thus to determine when the desired number of production cycles has been reached. For example, using a particular base asphalt having a viscosity in the range of about 200 centipoise (cP) to 300 cP at about 400° F., it has been found that a desirable increase in PG grade is obtained when the asphalt modification methods described herein are applied to provide a modified asphalt having a viscosity in the range of about 800 cP to about 850 cP. In an embodiment (not illustrated in FIG. 1), the system 100 is equipped with an in-line viscometer that provides updated viscosity data on a real-time or nearly real-time basis. The methods and systems described herein may also be operated on a continuous or near-continuous basis. For example, the system 100 may be operated as described herein to produce modified asphalt which collects in the container 102. During production, selected amounts of fresh base asphalt may be added to the container 102 while removing selected amounts of modified asphalt, e.g., via the valve 132 and the outlet 134.

The amount of increase in both the rutting resistance and the fatigue resistance obtained in any particular cycle is related to the extent to which the asphalt is oxidized and thus is affected by the process temperature (e.g., as controlled by the asphalt flow rate, shear rate and/or gas flow rate) and by the flow rate of the oxygen-containing gas through the rotor-stator mixing tool in the in-line mixer. In general, the flow rates of the asphalt and the oxygen-containing gas described herein are much less than would otherwise be considered optimal for obtaining the desired level of asphalt modification in the minimum amount of time. The lower flow rates of asphalt and oxygen-containing gas and multiple recirculations utilized in the illustrated embodiment tend to have a negative impact on throughput because of the additional time involved in achieving the desired level of oxidation. However, in terms of overall manufacturing efficiency, it has been found that the energy cost savings obtained by operating the in-line mixer as described above (e.g., in such a way that it draws an amount of power that is in the range of about 60% to about 95% of the maximum power rating of the in-line mixer) more than compensates for the loss in throughput. Likewise, it has been found that controlling the asphalt temperature on the exit side of the in-line mixer (e.g., by controlling the asphalt flow rate, shear rate and/or gas flow rate) results in a desirable level of asphalt modification. Controlling the amount of power drawn by the in-line mixer (during the simultaneous heating and agitating of the base asphalt) by controlling the flow rate of the oxygen-containing gas as described herein has been found to be particularly effective method for achieving overall production efficiency.

In an embodiment, a modified asphalt made as described herein (e.g., having at least two paving properties that are substantially improved as compared to the base asphalt from which it is made) may be blended with a second base asphalt to produce a second modified asphalt having at least one paving property that is substantially improved as compared to the second base asphalt. The second modified asphalt may be referred to herein as a back-blended asphalt, as described in U.S. Pat. No. 7,374,659. It will be understood that the second base asphalt may itself be a modified asphalt, and thus various batches of modified asphalts may be blended with one another. It will also be understood that three or more asphalts, at least one of which is a modified asphalt, may be blended together. Such blending may be carried out for various reasons, e.g., to produce a modified asphalt having a particular value for a particular paving property. Blending of a modified asphalt with a second base asphalt to produce a back-blended asphalt may be carried out using ordinary asphalt mixing equipment known to those skilled in the art, and the amounts of modified asphalt in the back-blended asphalt may be varied over a broad range, e.g., from about 0.1% to about 99.9%.

The level of oxygen in the oxygen-containing gas may vary over a broad range, e.g., from about 1% to about 100% by volume, based on total gas volume. The oxygen-containing gas may comprise various additional gases such as nitrogen, argon, and/or carbon dioxide. Preferably, the oxygen-containing gas comprises air. The oxygen-containing gas is preferably blown into the base asphalt at a high gas flow rate that depends on the level of oxygen in the gas. The oxygen content of the oxygen-containing gas and/or the high gas flow rate may be maintained at a particular level throughout the modification process, or each may be independently varied throughout the process.

The asphalt flow rate and/or high gas flow rate of the oxygen-containing gas are preferably selected in conjunction with at least one of the high shear rate, the elevated temperature, the amount of power drawn by the in-line mixer and the treatment time to substantially improve at least two paving properties of the base asphalt. More preferably, the asphalt flow rate and/or high gas flow rate are selected in conjunction with at least one of the high shear rate, the elevated temperature, the amount of power drawn by the in-line mixer and the treatment time to substantially improve both the rutting resistance and the fatigue resistance of the modified asphalt as compared to the base asphalt. Appropriate asphalt flow rates and high gas flow rates for making particular modified asphalts may be selected by one skilled in the art by conducting routine experimentation in light of the guidance provided herein.

The base asphalt is at an elevated temperature while the oxygen-containing gas is blown through the base asphalt in the in-line mixer at a high gas flow rate and while simultaneously agitating the base asphalt at a high shear rate using the in-line mixer. As discussed above, the elevated temperature may be achieved by applying external heating to the container holding the base asphalt, or the elevated temperature may be achieved without external heating. For example, it has been found that elevated temperatures may be achieved simply by air-blowing at high air flow rates and simultaneously agitating at high shear rates. This invention is not bound by theory, but it is believed that the achievement of such elevated temperatures in the absence of external heating may result from the exothermic nature of a chemical reaction between the oxygen-containing gas and the base asphalt binder, and/or may result from the energy supplied to the base asphalt binder by the mechanical agitation. Thus, in various embodiments, the elevated temperature may be maintained within a desired range by external heating, by controlling the flow rate of the oxygen-containing gas, by controlling the shear rate, and/or by applying external cooling.

The elevated temperature is preferably selected in conjunction with the asphalt flow rate, the high gas flow rate, the high shear rate and the treatment time to substantially improve at least two paving properties of the base asphalt. More preferably, the elevated temperature is selected in conjunction with the asphalt flow rate, the high gas flow rate, the high shear rate, and the treatment time to substantially improve both the rutting resistance and the fatigue resistance of the modified asphalt as compared to the base asphalt. Appropriate elevated temperatures for making particular modified asphalts may be selected by one skilled in the art by conducting routine experimentation in light of the guidance provided herein. The elevated temperature for carrying out the methods described herein, as measured in the container 102, is typically in the range of about 250° F. to about 550° F., preferably in the range of about 380° F. to about 470° F., more preferably in the range of about 400° F. to about 450° F. ° C. The elevated temperature may be maintained at a particular level or within a particular range throughout the modification process, or may be varied throughout the process.

The base asphalt is agitated at a high shear rate using an in-line mixer at an elevated temperature while the oxygen-containing gas is blown through the base asphalt at a high gas flow rate and while simultaneously maintaining the base asphalt at an elevated temperature. The high shear rate is applied to the base asphalt using an in-line mixer equipped with a rotor-stator mixing tool. The high shear rate is preferably selected in conjunction with the asphalt flow rate, the high gas flow rate of the oxygen-containing gas, the elevated temperature and the treatment time to substantially improve at least two paving properties of the base asphalt. More preferably, the high shear rate is selected in conjunction with the asphalt flow rate, the high gas flow rate, the elevated temperature and the treatment time to substantially improve both the rutting resistance and the fatigue resistance of the modified asphalt as compared to the base asphalt. Appropriate high shear rates for making particular modified asphalts may be selected by one skilled in the art by conducting routine experimentation in light of the guidance provided herein.

Figure 8:
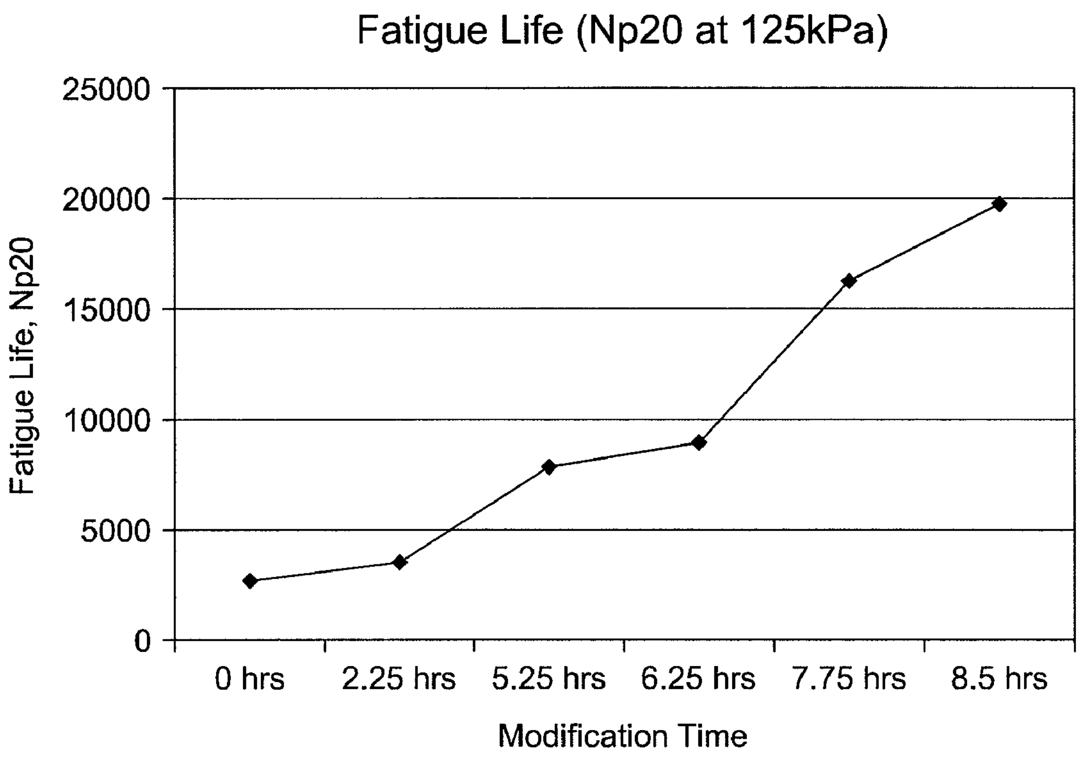
FIG. 8 is plot showing a continuing increase in fatigue life as the modification time increases.

The treatment time is the residence time of the asphalt in the in-line mixer, during which the base asphalt is modified by blowing an oxygen-containing gas through the base asphalt at a high gas flow rate while simultaneously agitating the base asphalt at a high shear rate and at an elevated temperature. The treatment time for any particular volume of asphalt, e.g., the asphalt 104 in the container 102, is the total amount of time that the in-line mixer is operating during any particular production cycle, which may include recirculation of the asphalt, e.g., multiple loops of the production cycle 114. The treatment time may be varied over a broad range. For example, the treatment time can last as long as several days. In an embodiment, the treatment time is in the range of about 20 minutes to about 24 hours. In an embodiment, the treatment time is at least 1 hour. In an embodiment, the treatment time is at least 2 hours. In an embodiment, the treatment time is at least 3 hours. In an embodiment, the treatment time is at least 4 hours. In an embodiment, the treatment time is at least 5 hours. A mixing time of about 60 minutes was used to obtain the data shown in Table 1 of U.S. Pat. No. 7,374,659. Some effects of varying the treatment time are illustrated in FIGS. 8-9 of U.S. Pat. No. 7,374,659. The treatment time is preferably is preferably selected in conjunction with the asphalt flow rate, the high gas flow rate of the oxygen-containing gas, the high shear rate and the elevated temperature to substantially improve at least two paving properties of the base asphalt. More preferably, the treatment time is selected in conjunction with the asphalt flow rate, the high gas flow rate, the high shear rate and the elevated temperature to substantially improve both the rutting resistance and the fatigue resistance of the modified asphalt as compared to the base asphalt. Appropriate treatment times for making particular modified asphalts may be selected by one skilled in the art by conducting routine experimentation in light of the guidance provided herein.

Various additives may be incorporated into the modified asphalts and mixtures thereof described herein. Such additives may be intermixed at various stages of the process, e.g., one or more additives may be intermixed with the base asphalt (e.g., in the container 102), with the partially modified asphalt during the modification process, and/or with the modified asphalt after the modification process. For example, a base asphalt may contain various additives known to those skilled in the art including, e.g., one or more air-blowing catalysts such as ferric chloride ($FeCl_3$), ferrous chloride ($FeCl_2$), phosphorous pentoxide ($P_2O_5$), aluminum chloride ($AlCl_3$), boric acid, copper sulfate ($CuSO_x$), zinc chloride ($ZnCl_2$), phosphorous sesquesulfide ($P_4S_3$), phosphorous pentasulfide ($P_4S_5$), phytic acid ($C_6H_6O_6(H_2PO_3)_6$), phosphoric acid ($H_3PO_4$) and sulfonic acid. The following patents are incorporated herein by reference and particularly for the purpose of describing air-blowing catalysts and methods of making air-blown asphalts using such catalysts: U.S. Pat. Nos. 1,782,186; 2,200,914; 2,375,117; 2,450,756; 3,126,329; 4,338,137; 4,440,579; and 4,456,523. Part or all of the additive(s) may remain in the resulting modified asphalt. In some cases air-blowing catalysts are unnecessary or undesirable, and thus in an embodiment the base asphalt used for making a modified asphalt is substantially free of an air-blowing catalyst. Non-gaseous oxidizers, e.g., solids or liquids that release oxygen under high temperature and/or high shear conditions, may also be intermixed with the asphalt at various stages of the process. Examples of such oxidants include peroxides and hypochlorites. As another example of an additive, various elastomeric and/or non-elastomeric polymer modifiers (e.g., SBS, SBR, SEBS, crumb rubber, EVA) may be incorporated into the base asphalt and/or modified asphalt to improve other paving properties (e.g., elasticity/recoverability, low temperature properties), see, e.g., U.S. Pat. Nos. 5,342,866 and 5,336,705, both of which are hereby incorporated by reference and particularly for the purpose of describing polymers and methods of incorporating them into asphalts. Other additives known to those skilled in the art such as anti-stripping agents (e.g., lime to improve moisture susceptibility of asphalt) may also be incorporated into the base asphalt and/or modified asphalt. Those skilled in the art understand that additives are often included in asphalts in order to enhance the ability of the resulting asphalt to pass a Multiple Stress Creep and Recovery (MSCR) Test. In an embodiment, modified asphalts as described herein are capable of passing a Multiple Stress Creep and Recovery (MSCR) Test using less additives, as compared to the base asphalt from which the modified asphalt is prepared.

EXAMPLES

The methods of manufacturing modified asphalt described herein are applicable to various types of asphalt. Three different types of asphalt binder are described in detail below. Reference is made to FIG. 1.

Example 1

A batch of Valero PG 58-22 asphalt was obtained commercially and modified in accordance with the following procedure. The asphalt was subjected to a standard preliminary procedure known as the rolling thin film oven ("RTFO") procedure, which is well known in the art. The RTFO procedure simulates the conditions under which asphalt is processed in a hot-mix plant.

Twelve tons of the base asphalt (Valero PG 58-22 after application of RTFO procedure) was loaded into the container 102 at a loading temperature in the range of about 300° F. to about 350° F. Circulation of the base asphalt through the heated flow line 106*b* in the bypass loop 120 began as the material was heated to a temperature in the range of about 380° F. to about 400° F. Once heated, high shear agitation of the base asphalt was initiated by opening the valves 122*d* and 136, partly opening the valve 122*c* and allowing the base asphalt to flow through the in-line mixer 108. A portion of the base asphalt in the bypass loop 120 was diverted to the in-line mixer 108 via the partly opened valve 122*c*. As the flow lines warmed the valve 122*c* was gradually opened and the valve 122*e* was gradually closed. The in-line mixer 108 was powered up and air was provided from the gas source 110 via the open valve 136 to the rotor-stator mixing tool (within the in-line mixer 108), where it flowed through the openings in the mixing tool and intermixed with the hot base asphalt being agitated at high shear within the in-liner mixer 108 at the process temperature of about 400° F.

The in-line mixer 108 was a Supraton model S400 high shear in-line homogenizer equipped with a nozzle tool set, which includes a rotor-stator mixing tool having openings configured to introduce a gas into the material being mixed and having a maximum power rating of 100 horsepower (hp). The flow rate of the air flowing into the in-line mixer 108 was about 40 SCFM under atmospheric pressure. The asphalt flowed through the production loop 114 at a rate that was maintained in the range of about 150 to about 250 gallons, with the preferred flow rate being in the range of about 180 to about 200 gallons per minute. The in-line mixer 108 ran at shear rate of about 3560 rpm. The temperature of the asphalt flowing through the production loop 114 was maintained in the range of about 380 to about 470° F. during the modification process.

As the base asphalt was modified by the combination of asphalt flow rate, high shear rate, high gas flow rate, and elevated temperature, samples were removed from the system 100 at various points in time for measurement. In this example, samples were removed after 0 hours (starting material), 2 hours, 4 hours, 6 hours, 8 hours, and 10 hours. Once the desired viscosity of the modified asphalt was achieved, the in-line mixer was shut down and the modified asphalt flowed through the bypass line until the material was removed from the system 100 and sent for storage.

Figure 2:
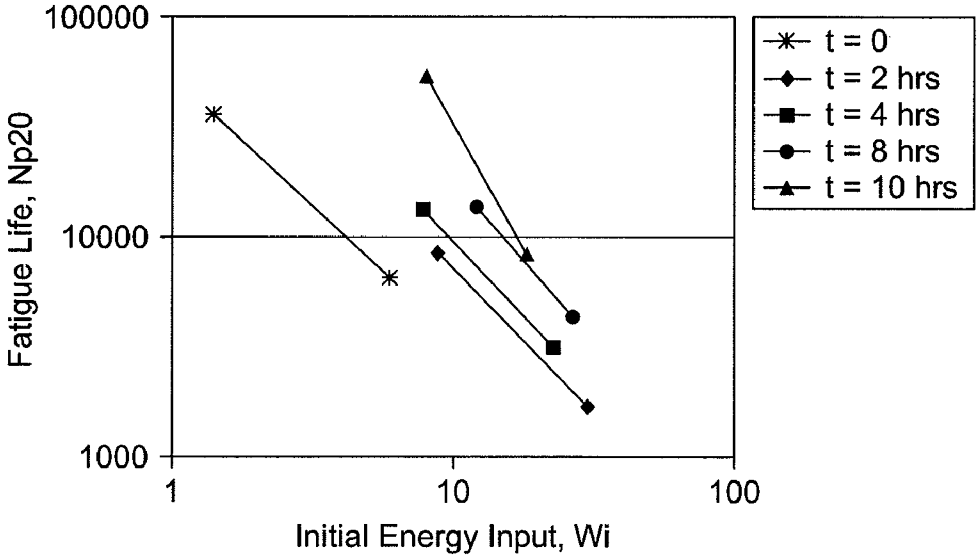
FIG. 2 is a plot of the fatigue life (Np20) versus the initial input energy (Wi) for a batch of Valero "RTFO" asphalt at differing durations of modification.

The fatigue resistance values of the modified asphalts were measured in accordance with NCHRP 9-10, at two different levels of applied stress. Thus, two data points were generated for each sample, as illustrated in FIG. 2. The data points are plotted with respect to fatigue life (Np20, the number of cycles at which the measured dissipated energy ratio is reduced by 20% as compared to no damage) versus initial input energy (Wi). As shown in FIG. 2, the asphalt binder can absorb a substantially larger amount of energy over its lifetime after undergoing the modification process described herein, even after only 2 hours of treatment. Upon longer duration of treatment, e.g. about 10 hours, the material can absorb a substantial amount of energy over a long period of time.

Example 2

A batch of Valero PG 58-22 asphalt was obtained commercially and modified in accordance with the procedure described in Example 1. However, this batch of asphalt was subjected to a different preliminary procedure known as the pressure aging vessel ("PAV") procedure, which is well known in the art. The PAV procedure simulates field aging. As in Example 1, samples were taken at various modification times, although the sample taken after 10 hours of modification was only tested at one stress level.

Figure 3:
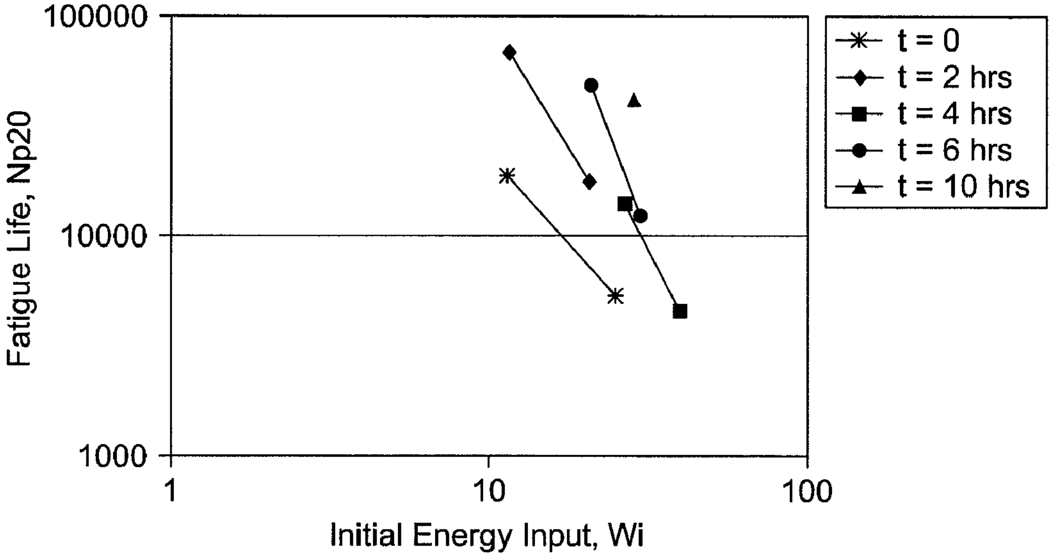
FIG. 3 is a plot of the fatigue life (Np20) versus the initial input energy (Wi) for a batch of Valero "PAV" asphalt at differing durations of modification.

As shown in FIG. 3, the fatigue life of the samples is improved upon modification of the asphalt as described herein. The fatigue resistance is improved in terms of both the life duration of the material (as indicated by increased values of Np20) and the amount of energy (as indicated by increased values of Wi) that it can absorb.

Example 3

A batch of AR-8000 asphalt was obtained commercially from San Joaquin Refining and modified in accordance with the procedure described in Example 1, with the exception that no preliminary RTFO procedure was applied.

Figure 4:
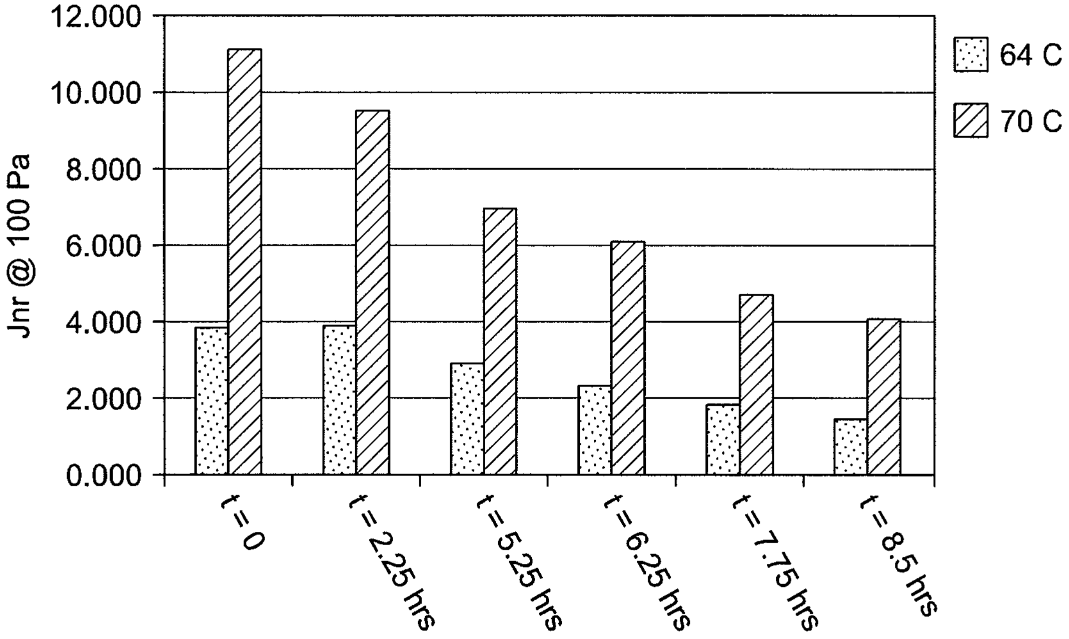
FIG. 4 shows the measurement of non-recoverable creep compliance (Jnr) for a batch of AR-8000 asphalt at 100 Pa for differing durations of modification.
Figure 5:
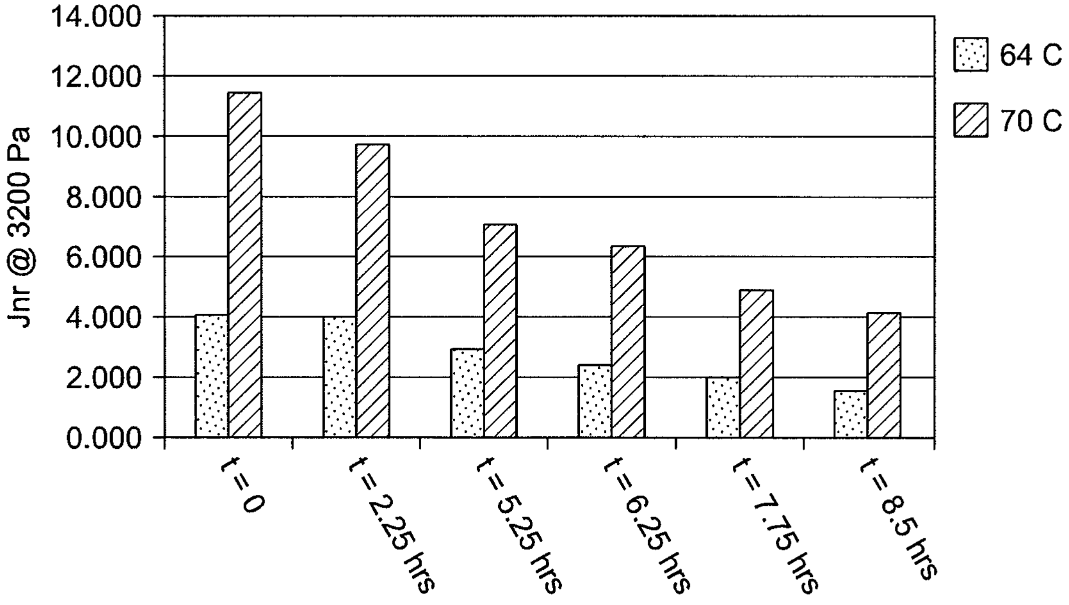
FIG. 5 shows the measurement of non-recoverable creep compliance (Jnr) for a batch of AR-8000 asphalt at 3200 Pa for differing durations of modification.

Samples were removed after 0 hours (starting material), 2.25 hours, 5.25 hours, 6.25 hours, 7.75 hours, and 8.5 hours, respectively. The modified asphalts were tested for rutting resistance following the MSCR procedure by applying a load for 1 second and removing it for 9 seconds. The loading sequence was applied for 10 cycles at 100 Pa followed by 10 cycles at 3200 Pa. FIGS. 4 and 5 show the non-recoverable creep compliance (Jnr) for the 100 Pa test and the 3200 Pa test, respectively. Data points were taken at about 64° C. and at about 70° C. for each sample. As seen in FIG. 4 and FIG. 5, the Jnr values steadily decreased with increased processing times, indicating increased stiffness and greater rutting resistance. The margin of improvement is significant and provides, e.g., one grade change (PG 64 to PG 70) after a few hours of modification. The similar results measured at 100 Pa and 3200 Pa indicate that the modified asphalt is not sensitive to stress.

Additional Tests

Figure 6:
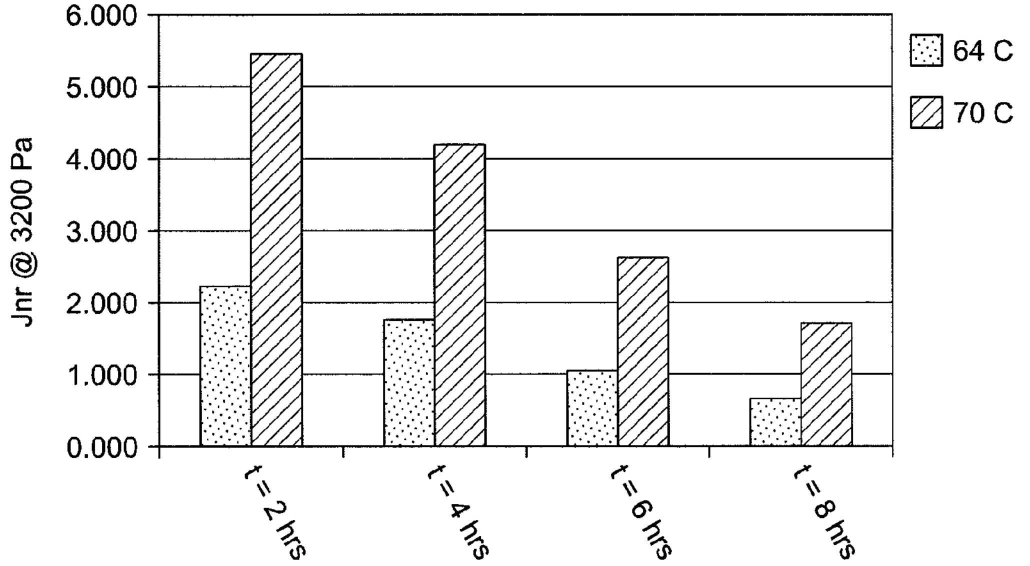
FIG. 6 shows the measurement of non-recoverable creep compliance (Jnr) for a batch of Valero "RTFO" asphalt at 3200 Pa for differing durations of modification.

Samples obtained in accordance with Example 1 were tested for rutting resistance at 3200 Pa in accordance with the test described above in Example 3 with reference to FIG. 4 and FIG. 5. The results are shown in FIG. 6. As can be seen in FIG. 6, the rutting resistance of the Valero asphalt improved significantly as the duration of asphalt modification increased. Thus, both fatigue resistance and rutting resistance of the Valero asphalt were improved by applying the modification process described herein.

Figure 7:
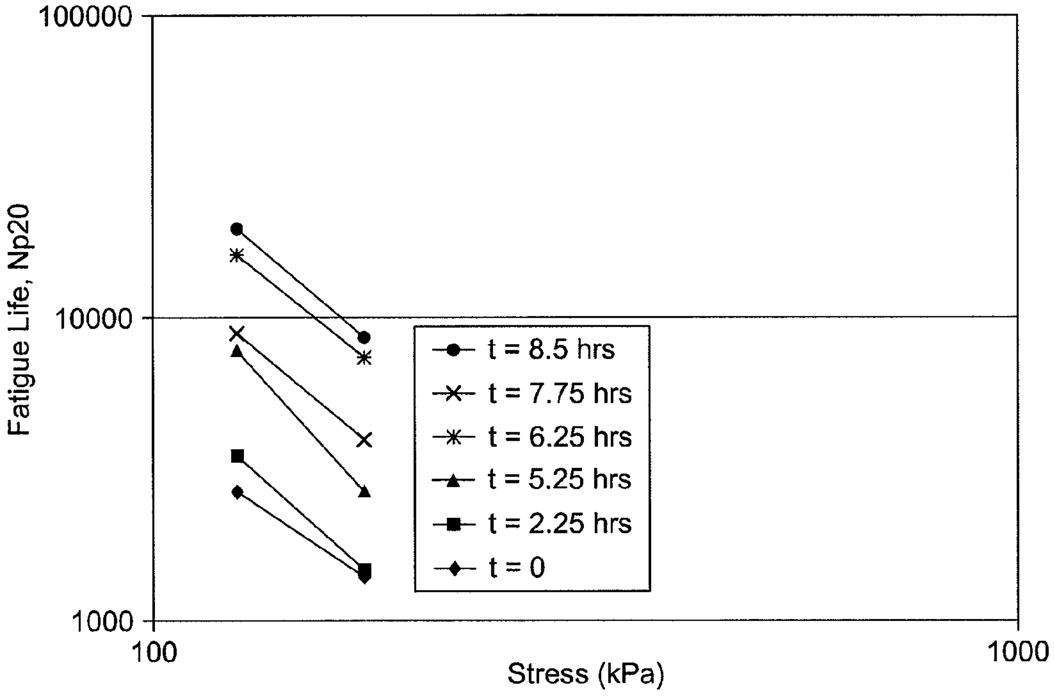
FIG. 7 is a plot of the fatigue life versus stress at two different stress levels, 125 kPa and 175 kPa, for a batch of AR-8000 asphalt.

Samples obtained in accordance with Example 3 were tested for fatigue resistance. The initial input energy was fixed, and the fatigue life (Np20) was plotted against the stress (kPa) for two different stress levels, 125 kPa and 175 kPa. As shown in FIG. 7, the fatigue life of the asphalt binder increased with the modification time of the asphalt. FIG. 8 illustrates the steady and continuous increase in fatigue resistance at the 125 kPa stress level. Thus, both fatigue resistance and rutting resistance of the AR-8000 asphalt were improved as a result of the modification process described herein.

U.S. Pat. No. 7,374,659 is incorporated herein by reference in its entirety for all purposes, and is not admitted prior art. Accordingly, all terminology used herein has the same meaning as set forth in U.S. Pat. No. 7,374,659, unless otherwise stated. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method for manufacturing a modified asphalt, comprising:

flowing a base asphalt at a base asphalt flow rate through an in-line mixer having a maximum power rating; and agitating the base asphalt at a high shear rate using the in-line mixer while simultaneously (a) blowing the oxygen-containing gas at a high gas flow rate through the in-line mixer and (b) heating the base asphalt at an elevated temperature for a treatment time to thereby produce a modified asphalt;

wherein the base asphalt flow rate, the high gas flow rate, the high shear rate, the elevated temperature and the treatment time are all selected to substantially improve both the rutting resistance and the fatigue resistance of the modified asphalt as compared to the base asphalt.

2. The method of claim 1 in which the base asphalt flow rate is further selected to control the amount of power drawn by the in-line mixer during the agitating of the base asphalt, the amount of power being in the range of about 60% to about 95% of the maximum power rating.

3. The method of claim 2 in which the amount of power is in the range of about 70% to about 90% of the maximum power rating.

4. The method of claim 1 in which the base asphalt flow rate is further selected to provide an elevated temperature in the range of about 380° F. to about 470° F.

5. The method of claim 1 in which the base asphalt flow rate is further selected to provide an elevated temperature in the range of about 400° F. to about 450° F.

6. The method of claim 1 in which the high gas flow rate is further selected to control the amount of power drawn by the in-line mixer during the agitating of the base asphalt, the amount of power being in the range of about 60% to about 95% of the maximum power rating.

7. The method of claim 6 in which the amount of power is in the range of about 70% to about 90% of the maximum power rating.

8. The method of claim 1 in which the oxygen-containing gas comprises air.

9. The method of claim 1 in which the elevated temperature is in the range of about 250° F. to about 500° F.

10. The method of claim 9 in which the elevated temperature is in the range of about 380° F. to about 470° F.

11. The method of claim 1 in which the agitating of the base asphalt at the high shear rate using the in-line mixer comprises recirculating at least a portion of the base asphalt through the in-line mixer.

12. The method of claim 11 in which at least one of the base asphalt flow rate, the high gas flow rate, the high shear rate, the elevated temperature and the treatment time, is maintained at substantially the same level during the recirculating.

13. The method of claim 11 in which at least one of the base asphalt flow rate, the high gas flow rate, the high shear rate, the elevated temperature and the treatment time, is altered to be at a substantially different level during the recirculating.

14. The method of claim 1 in which the shear rate is at least about 2000 rpm.

15. A system for modifying asphalt, comprising:

a container configured to hold a base asphalt at an elevated container temperature;

a set of heated flow lines configured to carry the base asphalt to an in-line mixer and back to the container while maintaining the base asphalt at elevated process temperatures, wherein the in-line mixer has a maximum power rating and wherein the in-line mixer is configured to allow an oxygen-containing gas to be blown through the base asphalt while flowing the base asphalt through the in-line mixer, the in-line mixer being configured to agitate the base asphalt at a high shear rate;

a gas source configured to introduce the oxygen-containing gas into the in-line mixer at a high gas flow rate; and a controller configured to control the base asphalt flow rate, the gas flow rate and the high shear rate, the controller being further configured to control the amount of power drawn by the in-line mixer by controlling at least one of the base asphalt flow rate and the gas flow rate during the agitating of the base asphalt, the amount of power drawn by the in-line mixer being in the range of about 60% to about 95% of the maximum power rating.

16. The system of claim 15 in which the controller comprises a computer.

17. The system of claim 15, further comprising an in-line viscometer configured to measure the viscosity of the base asphalt.

* * * * *